United States Patent
Shin et al.

(10) Patent No.: US 8,086,105 B2
(45) Date of Patent: Dec. 27, 2011

(54) WAVELENGTH DIVISION MULTIPLEXER/DEMULTIPLEXER HAVING FLAT WAVELENGTH RESPONSE

(75) Inventors: Jang Uk Shin, Daejeon (KR); Sang Ho Park, Daejeon (KR); Young Tak Han, Daejeon (KR); Sang Pil Han, Daejeon (KR); Yong Soon Baek, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 642 days.

(21) Appl. No.: 12/241,692

(22) Filed: Sep. 30, 2008

(65) Prior Publication Data
US 2009/0154928 A1    Jun. 18, 2009

(30) Foreign Application Priority Data

Dec. 14, 2007 (KR) .................. 10-2007-0130709
May 27, 2008 (KR) .................. 10-2008-0049078

(51) Int. Cl.
*H04J 14/02* (2006.01)
(52) U.S. Cl. ............................................. 398/79
(58) Field of Classification Search .............. 398/79
See application file for complete search history.

(56) References Cited

U.S. PATENT DOCUMENTS

| 5,467,418 | A | 11/1995 | Dragone | |
|---|---|---|---|---|
| 6,188,818 | B1 * | 2/2001 | Han et al. .................. | 385/24 |
| 6,882,778 | B2 * | 4/2005 | Fondeur et al. ............. | 385/37 |
| 2003/0185512 | A1 * | 10/2003 | Okamoto et al. ............ | 385/37 |
| 2006/0233491 | A1 * | 10/2006 | Kitoh et al. ................ | 385/37 |

FOREIGN PATENT DOCUMENTS

| JP | 2003-014962 A | 1/2003 |
|---|---|---|
| JP | 2004-212435 A | 7/2004 |
| JP | 2004-212886 A | 7/2004 |
| JP | 2005-326468 A | 11/2005 |
| KR | 1020000073473 | 12/2000 |

OTHER PUBLICATIONS

Okamoto et al., Flat spectral response arrayed-waveguide grating multiplexer with parabolic waveguide horns, Electronic Letters, Aug. 29, 1996, vol. 32, No. 18, pp. 1661-1662, IEE.

* cited by examiner

*Primary Examiner* — Kinam Park
(74) *Attorney, Agent, or Firm* — Rabin & Berdo, P.C.

(57) ABSTRACT

Provided is a wavelength division multiplexer/demultiplexer having a flat wavelength response. In the wavelength division multiplexer/demultiplexer, a modified taper-shaped optical waveguide is interposed between an input waveguide and a first slab waveguide, such that the distribution of an optical signal input to an Arrayed Waveguide Grating (AWG) has a sinc-function shape. Thus, a flat wavelength response can be obtained in an output waveguide. In addition, the modified taper-shaped optical waveguide interposed to obtain a flat wavelength response has a small size and a simple structure, and thus can be applied to a conventional wavelength division multiplexer/demultiplexer without a design change.

6 Claims, 4 Drawing Sheets

WAVELENGTH DIVISION MULTIPLEXER/DEMULTIPLEXER HAVING FLAT WAVELENGTH RESPONSE

CROSS-REFERENCE TO RELATED APPLICATION

This application claims priority to and the benefit of Korean Patent Application Nos. 2007-130709, filed Dec. 14, 2007 and 2008-49078, filed May 27, 2008, the disclosures of which are incorporated herein by reference in their entirety.

BACKGROUND

1. Field of the Invention

The present invention relates to a wavelength division multiplexer/demultiplexer having a flat wavelength response, and more particularly, to a wavelength division multiplexer/demultiplexer that makes the distribution of an optical signal input to an Arrayed Waveguide Grating (AWG) in a sinc-function shape and can obtain a flat wavelength response.

This work was supported by the IT R&D program of MIC/IITA [2007-S-011-01, Development of Optical Switches for ROADM].

2. Discussion of Related Art

In Wavelength Division Multiplexing (WDM) communication, a transmitter multiplexes optical signals having several wavelengths and transfers the multiplexed optical signals through one optical fiber, and a receiver demultiplexes the multiplexed optical signals according to the wavelengths and separately uses the respective optical signals. An AWG is used for such multiplexing/demultiplexing.

FIG. 1 illustrates a conventional wavelength division multiplexer/demultiplexer using an AWG.

Referring to FIG. 1, in a conventional wavelength division multiplexer/demultiplexer 100 using an AWG 114, the AWG 114 consisting of a plurality of arrayed waveguides having a specific optical path difference is coupled between first and second slab waveguides 112 and 116.

When a multiplexed signal is input from an input waveguide 110 to the wavelength division multiplexer/demultiplexer 100, it is passed through the first slab waveguide 112, demultiplexed into respective channels by the AWG 114, and output to output waveguides 118 through the second slab waveguide 116. On the other hand, when a plurality of optical signals having different wavelengths are input from the output waveguides 118, they are passed through the second slab waveguide 116, multiplexed by the AWG 114, and output to the input waveguide 110 through the first slab waveguide 112.

Such operations of the wavelength division multiplexer/demultiplexer 100 may be described by a grating equation, which describes a distribution characteristic of incident light according to diffraction by regarding the AWG 114 as a diffraction grating. This will be described in further detail below.

First, a wavelength focused on the central axis of the second slab waveguide 116 in a rear part satisfies Equation 1 below.

$$\beta \cdot \Delta L = \frac{2\pi}{\lambda_o} \cdot n_{eff} \cdot \Delta L = \pm 2m\pi \qquad \text{[Equation 1]}$$

In Equation 1, $\beta$ denotes a propagation constant, $n_{eff}$ denotes a mode refractive index of the input waveguide 110, $\lambda_o$ denotes a center wavelength, m denotes a grating order of the AWG 114, and $\Delta L$ denotes a path difference of the AWG 114.

Here, a specific wavelength $\lambda$ which has deviated from the center wavelength $\lambda_0$ by $\lambda_1$ ($\lambda=\lambda_0+\lambda_1$) crosses the central axis at a specific angle, and satisfies Equation 2 below.

$$\frac{2\pi}{\lambda} \cdot n_{eff} \cdot \Delta L = \frac{2\pi}{\lambda} \cdot n_{slab} \cdot a \cdot \theta \pm 2m\pi \qquad \text{[Equation 2]}$$

In Equation 2, $\lambda$ denotes the specific wavelength which has deviated from the center wavelength $\lambda_0$ by $\lambda_1$, $n_{slab}$ denotes a mode refractive index of a slab waveguide, a denotes an interval between centers of the AWG 114, and $\theta$ denotes an angle with respect to the central axis.

Therefore, by simultaneously solving Equation 1 and Equation 2, the angle $\theta$ of the specific wavelength $\lambda$ with respect to the central axis can be expressed as shown in Equation 3 below.

$$\frac{2\pi}{\lambda} \cdot n_{slab} \cdot a \cdot \theta = 2\pi \cdot \Delta L \left( \frac{n_{eff}^{\lambda}}{\lambda} - \frac{n_{eff}^{\lambda_o}}{\lambda_o} \right) \qquad \text{[Equation 3]}$$

$$\theta = \frac{\Delta L}{a} \left( \frac{n_{eff}^{\lambda}}{n_{slab}^{\lambda}} - \frac{n_{eff}^{\lambda_o}}{n_{slab}^{\lambda_o}} \cdot \frac{\lambda}{\lambda_o} \right)$$

In Equation 3, $\lambda_0$ denotes the center wavelength, $\lambda$ denotes the specific wavelength which has deviated from the center wavelength $\lambda_0$ by $\lambda_1$, $n_{eff}$ denotes the mode refractive index of the input waveguide 110, $n_{slab}$ denotes the mode refractive index of the slab waveguide, a denotes an interval between centers of the AWG 114, $\theta$ denotes the angle with respect to the central axis, and $\Delta L$ denotes the path difference of the AWG 114.

Meanwhile, the power of light output to the output waveguides 118 while crossing the central axis at the angle $\theta$ can be expressed as shown in Equation 4 below.

$$E_\theta = \sum_{j=1}^{n} f_j \cdot g_j \cdot \exp\left( 2\pi i \cdot \frac{n_{eff}^{\lambda}}{\lambda} \cdot j\Delta L \right) \qquad \text{[Equation 4]}$$

In Equation 4, $f_j$ denotes an optical coupling coefficient of an optical signal transferred from the input waveguide 110 to the AWG 114, $g_j$ denotes an optical coupling coefficient of an optical signal transferred from the AWG 114 to the output waveguides 118, the exponential function denotes a change in phase caused by a path difference between respective arrayed waveguides, and n denotes a total number of arrayed waveguides of the AWG 114.

In the case of the optical coupling coefficient $f_j$, all inputs are transferred along the central axis of the input waveguide 110 and thus have the same phase. On the other hand, in the case of the optical coupling coefficient $g_j$, inputs cross the central axis at the angle $\theta$. Thus, in consideration of a change in phase according to the angle $\theta$ with respect to the central axis, the optical coupling coefficient $g_j$ can be expressed as shown in Equation 5 below.

$$g_j = f_j \cdot \exp\left(2\pi i \cdot \frac{n_{slab}^\lambda}{\lambda} \cdot ja\theta\right) \quad \text{[Equation 5]}$$

By inserting the optical coupling coefficient $g_j$ obtained through Equation 5 into Equation 4, the power of an output optical signal can be expressed as shown in Equation 6 below.

$$E_\theta = \sum_{j=1}^{n} f_j^2 \cdot \exp\left\{2\pi i \cdot j\left(\frac{n_{eff}^\lambda}{\lambda} \cdot \Delta L + \frac{n_{slab}^\lambda}{\lambda} \cdot a\theta\right)\right\} \quad \text{[Equation 6]}$$

In Equation 6, the optical coupling coefficient $f_j$ denotes the power of each optical signal output through the output waveguides 118 and thus can be calculated by an overlap integral between a slab mode and a waveguide mode, a Beam-Propagation Method (BPM), or so on.

Therefore, when the input waveguide 110 crosses the central axis at an angle $\theta_{in}$, and the output waveguides 118 cross the central axis at an angle $\theta_{out}$, the optical coupling coefficients and the power of an optical signal output to the output waveguides 118 can be expressed as shown in Equation 7 below.

$$f_j = f_{jo} \cdot \exp\left(2\pi i \cdot \frac{n_{slab}^\lambda}{\lambda} \cdot ja\theta_{in}\right) \quad \text{[Equation 7]}$$

$$g_j = f_{jo} \cdot \exp\left(2\pi i \cdot \frac{n_{slab}^\lambda}{\lambda} \cdot ja\theta_{out}\right)$$

$$E(\theta_{in}, \theta_{out}) = \sum_{j=1}^{n} f_j^2 \exp\left\{2\pi i \cdot \frac{j}{\lambda}(n_{eff}^\lambda \cdot \Delta L + n_{slab}^\lambda \cdot a(\theta_{in} + \theta_{out}))\right\}$$

Referring to Equation 7, there is a Fourier-transform relationship between an optical signal input to the first and second slab waveguides 112 and 116 at the specific angle $\theta_{in}$ and an optical signal output from the first and second slab waveguides 112 and 116 at the specific angle $\theta_{out}$.

Therefore, to obtain a flat wavelength response, an optical signal input to the AWG 114 must have a sinc-function distribution.

However, the distribution of an input optical signal input to the input waveguide 110 is generally similar to a Gaussian distribution. Thus, an output signal output from the output waveguides 118 is also expected to have the Gaussian distribution.

A wavelength division multiplexer/demultiplexer having a Gaussian wavelength response narrows the available wavelength range of a light source in a communication system. Therefore, the light source is required to have high wavelength stability, and the establishment and maintenance cost of the communication system increases.

Consequently, to implement a wavelength division multiplexer/demultiplexer having a flat wavelength response, the distribution of an optical signal input to the AWG 114 must be made in the sinc-function shape, as mentioned above. To this end, the following methods have been disclosed.

According to a first method, the phase and loss of an AWG are adjusted such that the optical signal distribution of the AWG becomes similar to the sinc-function shape.

However, with respect to the length of the AWG, the length of the AWG in a specific section corresponding to a negative value of the sinc function must be adjusted to have a difference of a half wavelength, and an additional loss must be artificially caused in an optical waveguide. Thus, the first method is difficult to implement and also increases the insertion loss of a wavelength division multiplexer/demultiplexer by the amount of the additional loss of the AWG.

According to a second method, a parabolic horn waveguide is interposed in a boundary between an input waveguide and a first slab waveguide to make a double-peak-shape light distribution, and then the light distribution is projected to the output of a second slab waveguide as is, such that a combined optical signal has double peaks with respect to a wavelength in an output waveguide.

However, the second method requires a horn waveguide having a very complicated structure, and the horn waveguide must have a considerably large size to make a double-peak light distribution at the boundary between the input waveguide and the first slab waveguide. Thus, the overall size of a wavelength division multiplexer/demultiplexer considerably increases.

According to a third method, a multimode taper is interposed in a boundary between a second slab waveguide and an output waveguide to obtain a flat wavelength response using a coupling between the output waveguide and a high-order mode of a taper end.

However, when the width of the taper is small, the wavelength response becomes similar to the Gaussian distribution. To obtain a flat wavelength response characteristic, the width of the taper must be large to have a sufficient number of modes at the taper end. For this reason, the width of the output waveguide also increases, and the overall size of a wavelength division multiplexer/demultiplexer increases. In addition, several modes are blocked while being transferred from the taper to the single mode waveguide, and thus total insertion loss increases.

SUMMARY OF THE INVENTION

The present invention is directed to providing a wavelength division multiplexer/demultiplexer that makes the distribution of an optical signal input to an Arrayed Waveguide Grating (AWG) a sinc-function shape using a simple structure to obtain a flat wavelength response.

One aspect of the present invention provides a wavelength division multiplexer/demultiplexer having a flat wavelength response, comprising: an AWG comprising a plurality of arrayed waveguides having a specific optical path difference between a first slab waveguide coupled to an input waveguide and a second slab waveguide coupled to an output waveguide; and a modified taper-shaped optical waveguide interposed between the input waveguide and the first slab waveguide such that an optical signal input from the first slab waveguide to the AWG has a sinc-function distribution.

The modified taper-shaped optical waveguide may comprise: a first waveguide section coupled to the input waveguide and having a taper shape whose width increases from a width of the input waveguide according to a length of the first waveguide section; and a second waveguide section coupled to the first waveguide section and having a straight shape having the same width as an end of the first waveguide section. Here, a phase-change leading section may be formed by removing the modified taper-shaped optical waveguide by a specific length and a specific width to cause a change in phase distribution of a guided mode in the second waveguide section.

The phase distribution of the guided mode in the second waveguide section may be changed by the phase-change leading section, and the optical signal input from the first slab waveguide to the AWG may have the sinc-function distribution.

The first waveguide section may have a length corresponding to 5 to 100 times the width of the input waveguide not to excite a high-order mode while a fundamental mode input from the input waveguide is maintained as is and a mode width increases.

The second waveguide section may have a length corresponding to 0.3 to 2 times the length of the first waveguide section and a width corresponding to 1.2 to 3 times the width of the input waveguide to transfer the change in phase distribution of the guided mode caused by the phase-change leading section to the first slab waveguide.

The phase-change leading section may have a width corresponding to 0.3 to 1.5 times the width of the input waveguide. A position, the length and the width of the phase-change leading section may be adjusted such that the optical signal input from the first slab waveguide to the AWG has the sinc-function distribution.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
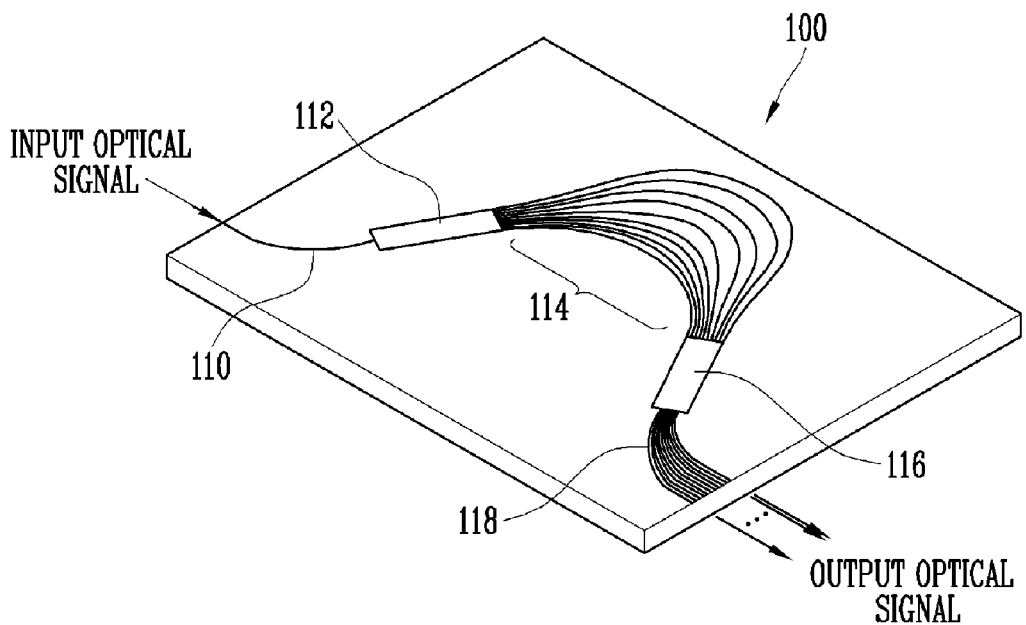
FIG. 1 illustrates a conventional wavelength division multiplexer/demultiplexer using an Arrayed Waveguide Grating (AWG)
Figure 2:
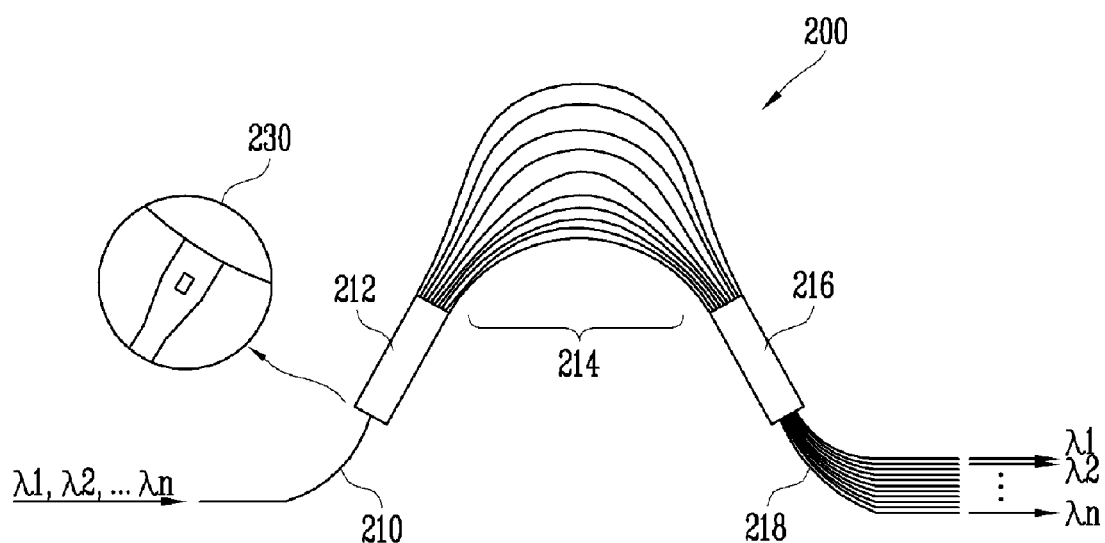
FIG. 2 illustrates a wavelength division multiplexer/demultiplexer according to an exemplary embodiment of the present invention.

FIG. 2 illustrates a wavelength division multiplexer/demultiplexer 200 according to an exemplary embodiment of the present invention.

Referring to FIG. 2, the wavelength division multiplexer/demultiplexer 200 according to an exemplary embodiment of the present invention has a structure in which an Arrayed Waveguide Grating (AWG) 214 including a plurality of arrayed waveguides having a specific optical path difference is interposed between a first slab waveguide 212 coupled to an input waveguide 210 and a second slab waveguide 216 coupled to output waveguides 218. Between the input waveguide 210 and the first slab waveguide 212, a modified taper-shaped optical waveguide 230 is interposed to obtain a flat wavelength response.

When an optical signal is input through the input waveguide 210, the first slab waveguide 212 disperses the input optical signal to have a specific distribution in a plane, and the AWG 214 divides the optical signal into a plurality of optical signals, such that the respective optical signals have different powers and a specific phase difference.

When the optical signals having different powers and the phase difference are input from respective arrayed waveguides of the AWG 214, the second slab waveguide 216 interferes with the respective optical signals of the arrayed waveguides to be focused at a specific position on the plane according to wavelengths, and the output waveguides 218 output the respective optical signals focused at the specific position by the second slab waveguide 216.

The noticeable characteristic of the present invention is that the optical signal input to the AWG 214 via the first slab waveguide 212 by the modified taper-shaped optical waveguide 230 has a sinc-function distribution, and it is possible to obtain a flat wavelength response in the output waveguides 218. The modified taper-shaped optical waveguide 230 according to an exemplary embodiment of the present invention will be described in detail below.

Figure 3:
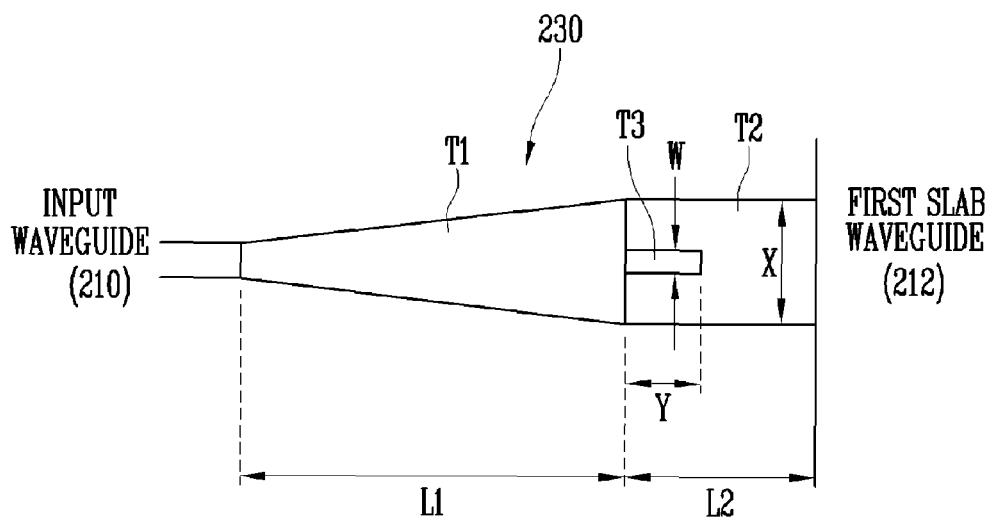
FIG. 3 is an enlarged view of a modified taper-shaped optical waveguide of FIG. 2.

FIG. 3 is an enlarged view of the modified taper-shaped optical waveguide 230 of FIG. 2.

Referring to FIG. 3, the modified taper-shaped optical waveguide 230 includes a first waveguide section T1 and a second waveguide section T2. The first waveguide section T1 is coupled to the input waveguide 210 and has a taper shape whose width increases from a width of the input waveguide 210 according to its length. The second waveguide section T2 is coupled to the first waveguide section T1 and has a straight shape whose width is the same as a width X of an end of the first waveguide section T1. In the second waveguide section T2, a phase-change leading section T3 is formed by removing the modified taper-shaped optical waveguide 230 by a specific length Y and a specific width W to cause a change in phase distribution of a guided mode.

Here, the phase-change leading section T3 may be extended to the first waveguide section T1 and disposed in the first and second waveguide sections T1 and T2. The appropriate position is calculated by a Beam-Propagation Method (BPM) such that optical signal distributions in the respective arrayed waveguides are optimized.

A length L1 of the first waveguide section T1 may have a value corresponding to 5 to 100 times the width of the input waveguide 210 not to excite a high-order mode while a fundamental mode input from the input waveguide 210 is maintained as is and a mode width increases, that is, such that the first waveguide section T1 satisfies a single waveguide condition.

A length L2 of the second waveguide section T2 may be 0.3 to 2 times the length L1 of the first waveguide section T1 to most effectively transfer the change in phase distribution of the guided mode caused by the phase-change leading section T3 to the first slab waveguide 212.

The width X of the second waveguide section T2 may be 1.2 to 3 times the width of the input waveguide 210. This is because the width X of the second waveguide section T2 must be 1.2 to 3 times the width of the input waveguide 210 to accurately form the phase-change leading section T3 in an actual process of fabricating a wavelength division multiplexer.

The width W of the phase-change leading section T3 may be 0.3 to 1.5 times the width of the input waveguide 210.

In brief, the modified taper-shaped optical waveguide 230 operates as follows. A change in phase distribution of a guided mode is caused by the phase-change leading section T3 in the second waveguide section T2, and thus the coupling coefficient of an optical signal input from the first slab waveguide 212 to the AWG 214 has the sinc-function distribution.

Here, the position, the length Y and the width W of the phase-change leading section T3 may be adjusted using a two-dimensional BPM such that the distribution of the optical signal input from the first slab waveguide 212 to the AWG 214 can be as close to the sinc-function distribution as possible.

As described above, according to the present invention, an optical signal input to the AWG 214 can simply have the sinc-function distribution without adjusting the lengths and losses of a large number of arrayed waveguides constituting the AWG 214, and thus it is possible to implement a wavelength division multiplexer/demultiplexer having a flat wavelength response.

In addition, according to conventional art, a parabolic horn waveguide or multimode taper having a width corresponding to 5 times or more of a waveguide width is necessary to obtain a flat wavelength response characteristic, and thus the size of a wavelength division multiplexer/demultiplexer increases. On the other hand, according to the present invention, an optical signal input to the first slab waveguide 212 has the sinc-function distribution due to the modified taper-shaped optical waveguide 230 having the same width as the input waveguide 210. Thus, it is possible to obtain a flat wavelength response using a smaller wavelength division multiplexer/demultiplexer than a conventional wavelength division multiplexer/demultiplexer.

Meanwhile, in this exemplary embodiment, the modified taper-shaped optical waveguide 230 is interposed between the input waveguide 210 and the first slab waveguide 212 to obtain a flat wavelength response. However, the modified taper-shaped optical waveguide 230 can be interposed between the second slab waveguide 216 and the output waveguides 218 to obtain a flat wavelength response.

Figure 4:
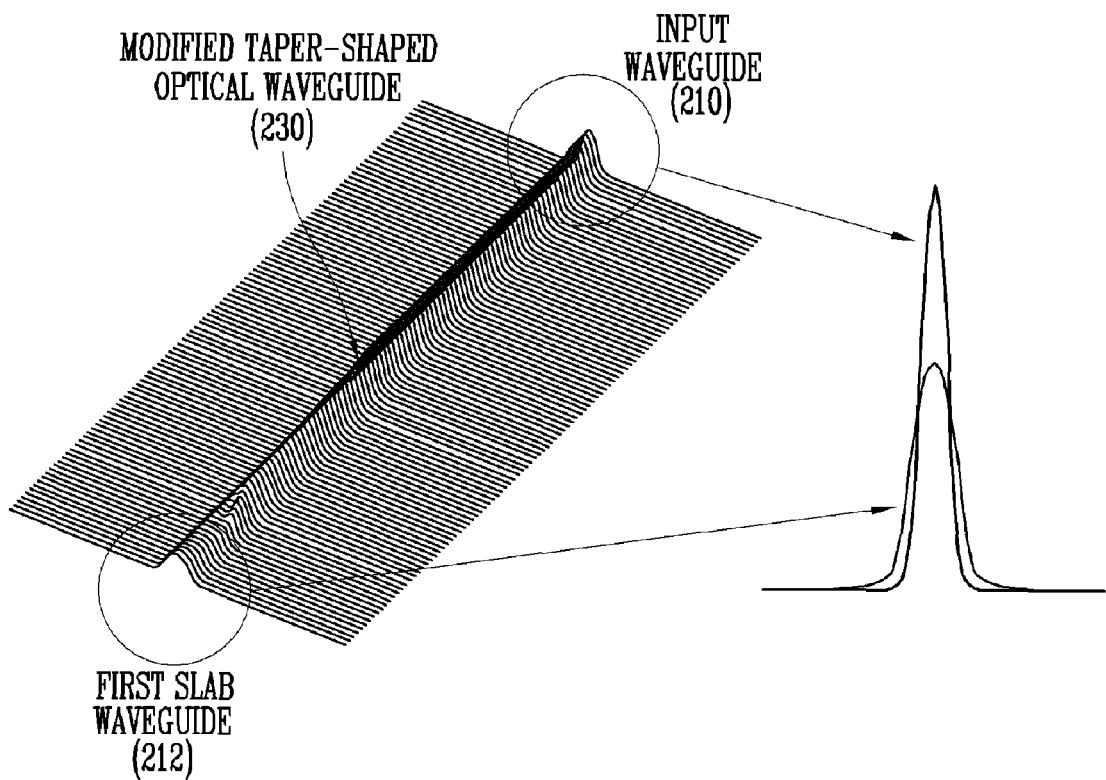
FIG. 4 illustrates a simulation result of an optical signal, which is input to an input waveguide of FIG. 2 and propagates to the boundary of a first slab waveguide through the modified taper-shaped optical waveguide, calculated by a two-dimensional Beam-Propagation Method (BPM)

FIG. 4 illustrates a simulation result of an optical signal, which is input to the input waveguide 210 of FIG. 2 and propagates to the boundary of the first slab waveguide 212 through the modified taper-shaped optical waveguide 230, calculated by the two-dimensional BPM.

Here, a waveguide having a refractive index difference of 1.5% between its core and cladding is used. The width of the input waveguide 210 is 4.5 μm. In the modified taper-shaped optical waveguide 230, the length of the first waveguide section T1 is 100 μm, the length and width of the second waveguide section T2 are 50 μm and 8 μm, respectively, and the length and width of the phase-change leading section T3 are 10 μm and 2 μm, respectively.

As illustrated in FIG. 4, the distribution of an optical signal input to the first slab waveguide 212 is not so different from the mode distribution of the input waveguide 210.

Figure 5A:
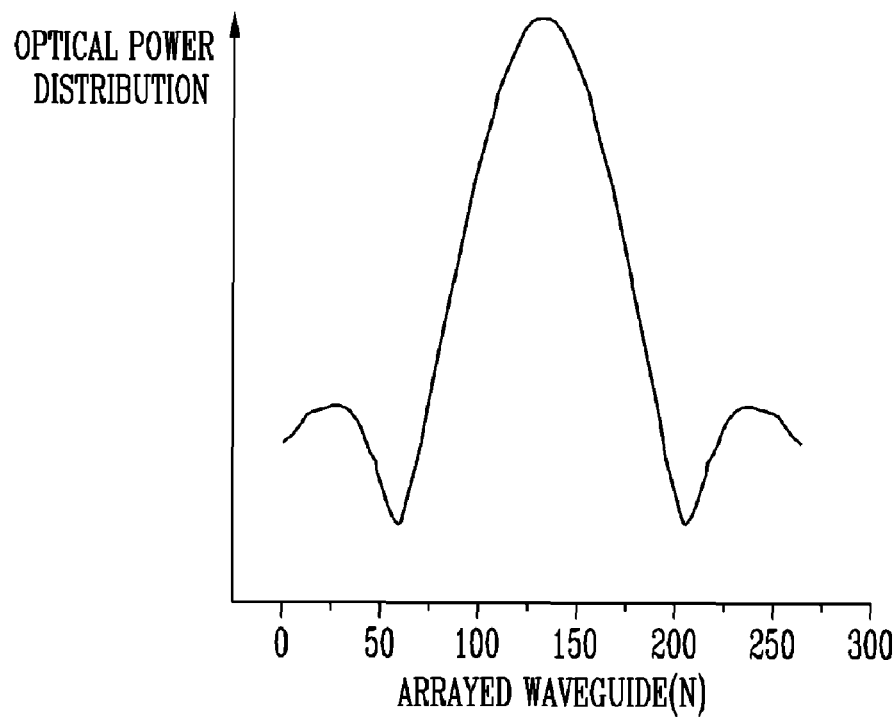
FIGS. 5A and 5B are graphs showing optical power distribution and phase distribution, respectively, of respective arrayed waveguides at the boundary between the first slab waveguide and an AWG of FIG. 2.
Figure 5B:
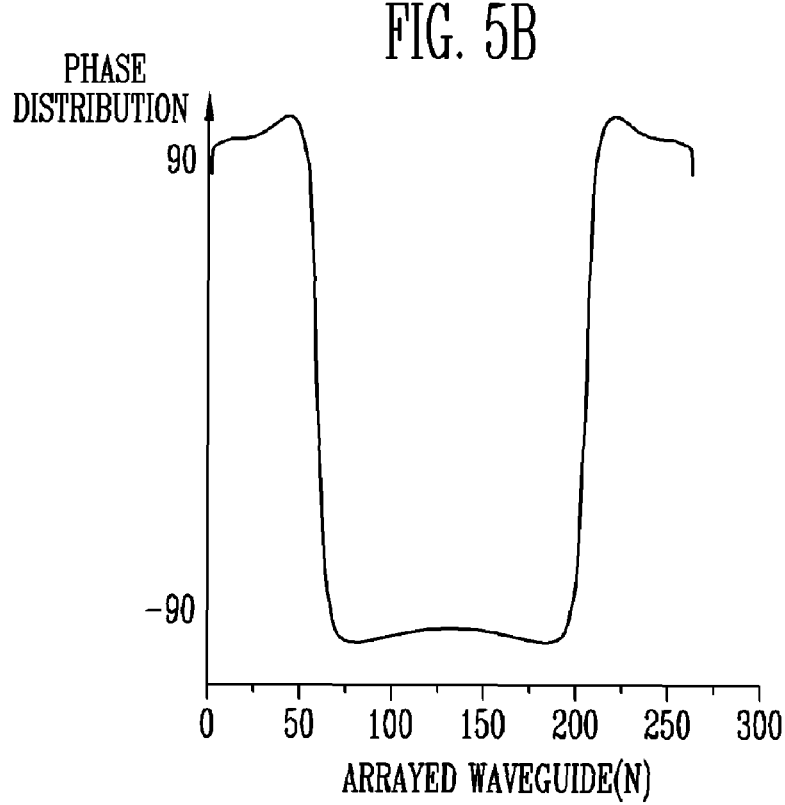

FIGS. 5A and 5B are graphs showing an optical power distribution and a phase distribution, respectively, of respective arrayed waveguides at the boundary between the first slab waveguide 212 and the AWG 214 of FIG. 2.

Referring to FIGS. 5A and 5B, the optical power distribution of the respective arrayed waveguides constituting the AWG 214 is similar to the square of the sinc function, and the phase distribution is similar to a spherical function whose external phase is inverted by 180 degrees. Therefore, the optical coupling coefficients of the respective arrayed waveguides approximate to the sinc function, and a flat wavelength response can be obtained.

Figure 6:
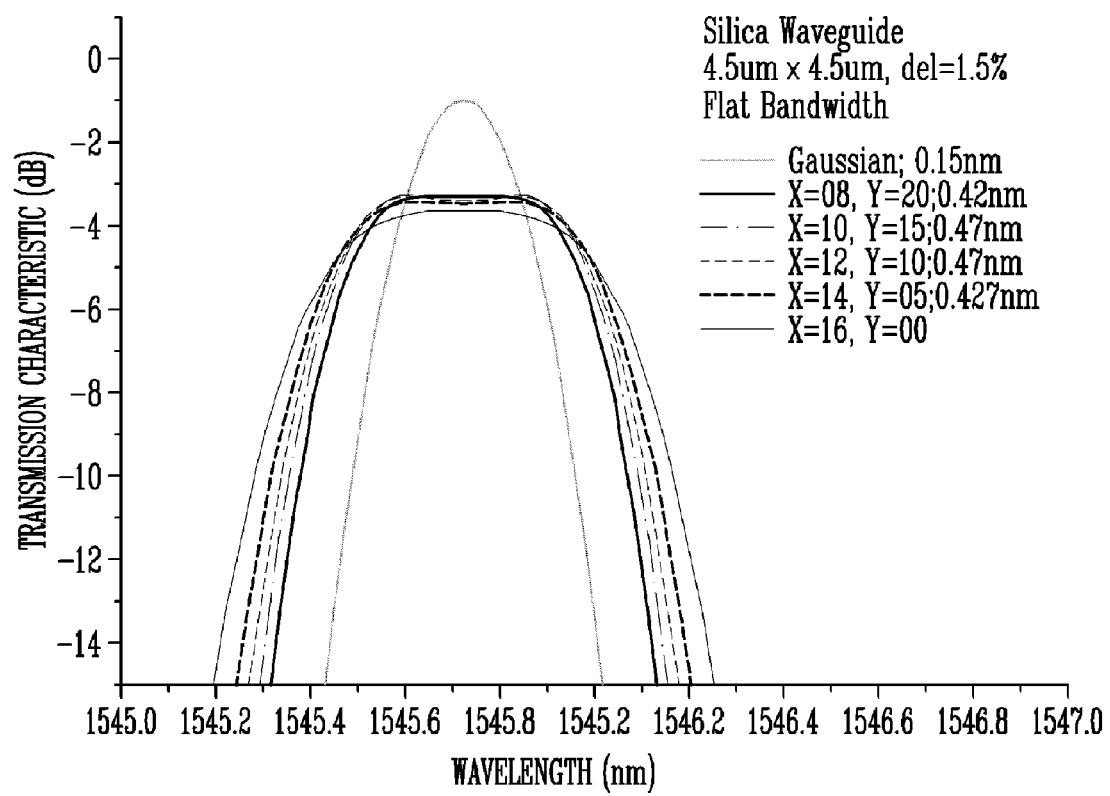
FIG. 6 is a graph showing the wavelength response characteristic of a wavelength division multiplexer/demultiplexer according to an exemplary embodiment of the present invention.

FIG. 6 is a graph showing the wavelength response characteristic of a wavelength division multiplexer/demultiplexer according to an exemplary embodiment of the present invention. The wavelength response characteristic is obtained when the width X of the second waveguide section T2 is changed to 8 μm, 10 μm, 12 μm and 14 μm in the modified taper-shaped optical waveguide 230, and the length Y of the phase-change leading section T3 is changed to 20 μm, 15 μm, 10 μm and 5 μm according to the change in width X of the second waveguide section T2.

As seen from FIG. 6, the length Y of the phase-change leading section T3 is adjusted regardless of the width X of the second waveguide section T2 in a wavelength division multiplexer/demultiplexer according to an exemplary embodiment of the present invention, such that a flat wavelength response corresponding to 50% or more of a channel spacing can be obtained.

A modified taper-shaped optical waveguide according to an exemplary embodiment of the present invention makes the distribution of an optical signal in the sinc-function shape. By interposing the modified taper-shaped optical waveguide between an input waveguide and a first slab waveguide or between an output waveguide and a second slab waveguide, the distribution of an optical signal input to an AWG can be simply made in the sinc-function shape. Consequently, it is possible to implement a wavelength division multiplexer/demultiplexer having a flat wavelength response.

In addition, the modified taper-shaped optical waveguide interposed to obtain a flat wavelength response has a small size and a simple structure, and thus can be applied to a conventional wavelength division multiplexer/demultiplexer without a design change.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A wavelength division multiplexer/demultiplexer having a flat wavelength response, comprising:
    an Arrayed Waveguide Grating (AWG) comprising a plurality of arrayed waveguides having a specific optical path difference between a first slab waveguide coupled to an input waveguide and a second slab waveguide coupled to an output waveguide; and
    a modified taper-shaped optical waveguide interposed between the input waveguide and the first slab waveguide such that an optical signal input from the first slab waveguide to the AWG has a sinc-function distribution;
    wherein the modified taper-shaped optical waveguide comprises:
    a first waveguide section coupled to the input waveguide and having a taper shape whose width increases from a width of the input waveguide according to a length of the first waveguide section;
    a second waveguide section coupled to the first waveguide section and having a straight shape having the same width as an end of the first waveguide section; and
    a phase-change leading section being formed by removing the modified taper-shaped optical waveguide by a specific length and a specific width to cause a change in phase distribution of a guided mode in the second waveguide section.

2. The wavelength division multiplexer/demultiplexer of claim 1, wherein the phase distribution of the guided mode in the second waveguide section is changed by the phase-change leading section, and the optical signal input from the first slab waveguide to the AWG has the sine-function distribution.

3. The wavelength division multiplexer/demultiplexer of claim 1, wherein the first waveguide section has a length corresponding to 5 to 100 times the width of the input waveguide so as not to excite a high-order mode while a fundamental mode input from the input waveguide is maintained as is and a mode width increases.

4. The wavelength division multiplexer/demultiplexer of claim 1, wherein the second waveguide section has a length corresponding to 0.3 to 2 times the length of the first waveguide section and a width corresponding to 1.2 to 3 times the width of the input waveguide to transfer the change in phase distribution of the guided mode caused by the phase-change leading section to the first slab waveguide.

5. The wavelength division multiplexer/demultiplexer of claim 1, wherein the phase-change leading section has a width corresponding to 0.3 to 1.5 times the width of the input waveguide.

6. The wavelength division multiplexer/demultiplexer of claim 1, wherein a position, the length and the width of the phase-change leading section are adjusted such that the optical signal input from the first slab waveguide to the AWG has the sinc-function distribution.

* * * * *